(12) United States Patent
Bartels

(10) Patent No.: US 6,664,770 B1
(45) Date of Patent: Dec. 16, 2003

(54) WIRELESS POWER TRANSMISSION SYSTEM WITH INCREASED OUTPUT VOLTAGE

(75) Inventor: Oliver Bartels, Erding (DE)

(73) Assignee: IQ- Mobil GmbH (DE)

( * ) Notice: Subject to any disclaimer, the term of this patent is extended or adjusted under 35 U.S.C. 154(b) by 0 days.

(21) Appl. No.: 09/890,794

(22) PCT Filed: Sep. 23, 2000

(86) PCT No.: PCT/EP00/09318

§ 371 (c)(1),
(2), (4) Date: Oct. 10, 2001

(87) PCT Pub. No.: WO01/41057

PCT Pub. Date: Jun. 7, 2001

(30) Foreign Application Priority Data

Dec. 5, 1999 (DE) .......................................... 199 58 265

(51) Int. Cl.$^7$ ............................................... G05F 1/656
(52) U.S. Cl. ..................... 323/222; 323/223; 323/351; 323/299; 455/572
(58) Field of Search ................................ 323/222, 223, 323/299, 349, 351; 455/41, 393, 571, 572; 340/827.72; 379/55.1

(56) References Cited

U.S. PATENT DOCUMENTS

| | | | | |
|---|---|---|---|---|
| 4,314,306 A | * | 2/1982 | Darrow | 246/34 C |
| 5,606,323 A | * | 2/1997 | Heinrich et al. | 340/10.34 |
| 5,850,181 A | * | 12/1998 | Heinrich et al. | 340/572.1 |
| 5,889,489 A | * | 3/1999 | Friedman et al. | 342/51 |
| 6,321,067 B1 | * | 11/2001 | Suga et al. | 455/106 |

FOREIGN PATENT DOCUMENTS

| | | | | |
|---|---|---|---|---|
| DE | 19702768 C1 | 4/1998 | | B60C/23/04 |
| GB | 2306081 A | 4/1997 | | |
| WO | WO 97/08811 | 3/1997 | | |
| WO | WO 01/41057 A1 | 6/2001 | | G06K/19/07 |

* cited by examiner

Primary Examiner—Adolf D. Berhane
Assistant Examiner—Gary L. Laxton
(74) Attorney, Agent, or Firm—Baker & Hostetler LLP

(57) ABSTRACT

The invention relates to a system for wireless power transmission, which makes it possible to generate an increased voltage on the receiver side using a radio signal that is optimized for this purpose and thereby permits operation particularly of digital semiconductor components in the receiver even if the receiver does not have a power supply of its own.

10 Claims, 2 Drawing Sheets

POWER TRANSMISSION SYSTEM

WIRELESS POWER TRANSMISSION SYSTEM WITH INCREASED OUTPUT VOLTAGE

BACKGROUND OF THE INVENTION

The object of the invention is to transmit power from a transmitter to a receiver to enable operation of additional circuit elements or components on the receiver even if the receiver does not have any power supply of its own. Such a requirement exists, for instance, in transponders mounted to fast rotating parts, which thus elude a reliable external power supply and in which the use of batteries should be avoided for reasons of minimum maintenance. Such transponders are used, for instance, for electronic control of the tire pressure in motor vehicles as well as to identify moving goods, or as an item protection system to prevent shoplifting.

Prior art systems use inductive methods (near field) or radio waves with a constant carrier for power transmission. Such systems are described in detail, for instance, in the RFID-Handbuch [RFID Manual] by Klaus Finkenzeller, Hanser Verlag. The disadvantage of inductive systems is that the coils for generating and drawing the power require a lot of space and are heavy. In the radio systems, relatively high transmitting power is required to obtain a useable voltage at the detector due to the defined impedance of the electromagnetic field in free space of approx. 377 ohm (which results from the square root of the ratio of the physical constants mu0 to epsilon0) and the drop in the power density squared to the distance. The maximum permissible transmitting power, however, is usually limited due to government restrictions. Impedance conversion after the antenna is furthermore possible only within limits due to the losses that occur-particularly at the higher frequencies. On the other hand, the use of higher frequencies is desirable because of the smaller antenna size, the improved directional effect of the antennae, and the broader available frequency spectrum.

With the method described in Patent DE 19702768 by the same inventor it is already possible to query analog measured values over relatively long distances, a method that is also used for industrial applications. This method, however, is based on a purely analog circuit in the transponder, which requires a substantially lower operating voltage than comparable digital circuits.

It would be desirable, however, to obtain the higher operating voltage required to operate digital circuit elements as well. Since these circuit elements generally require very little current due to the use of CMOS technology, the object of the invention is to increase the provided voltage at the cost of the maximum available current while keeping the available output constant.

Such components are sufficiently known as voltage transformers, although the employed circuits again function only starting from a certain minimum voltage because the clock generators are otherwise not stimulated to oscillate. On the other hand, the radio frequency is typically not suitable as the clock frequency because it is much too high for this purpose.

SUMMARY OF THE INVENTION

The present invention relates to a device or system for wireless power transmission, particularly a system for supplying transponders, including at least one high-frequency transmitter and at least one high-frequency receiver, each of which is connected to at least one antenna, wherein the receiver obtains its operating power from the transmitted high-frequency output, wherein the high-frequency transmitter is modulated with at least one converter clock suitable for a DC-DC converter, the receiver has at least one detector for demodulating the converter clock, the receiver generates a DC operating voltage for at least one DC-DC converter from the high frequency using at least one rectifier or detector-which may also be identical with a detector for demodulating the converter clock, the DC-DC converter using the transmitted converter clock, and generating another DC voltage to operate further circuit elements.

DETAILED DESCRIPTION OF THE PREFERRED EMBODIMENTS

According to the invention, a device or system for wireless power transmission, particularly for a system for supplying transponders, is described in detail below.

According to the invention, this problem is solved by the device set forth in claim 1 the function of which will now be described in detail.

The transmitter generates a pulse-modulated high-frequency signal. The pulse modulation frequency corresponds to the clock frequency of conventional DC-DC converters. The receiver now has at least one antenna-supplied rectifier with an energy storage element and a likewise supplied detector for the converter clock. Thus, two voltages are available: a continuous DC voltage at a low level and a square wave voltage. The latter now represents the clock for the DC-DC converter to increase the continuous DC voltage.

Figure 1:
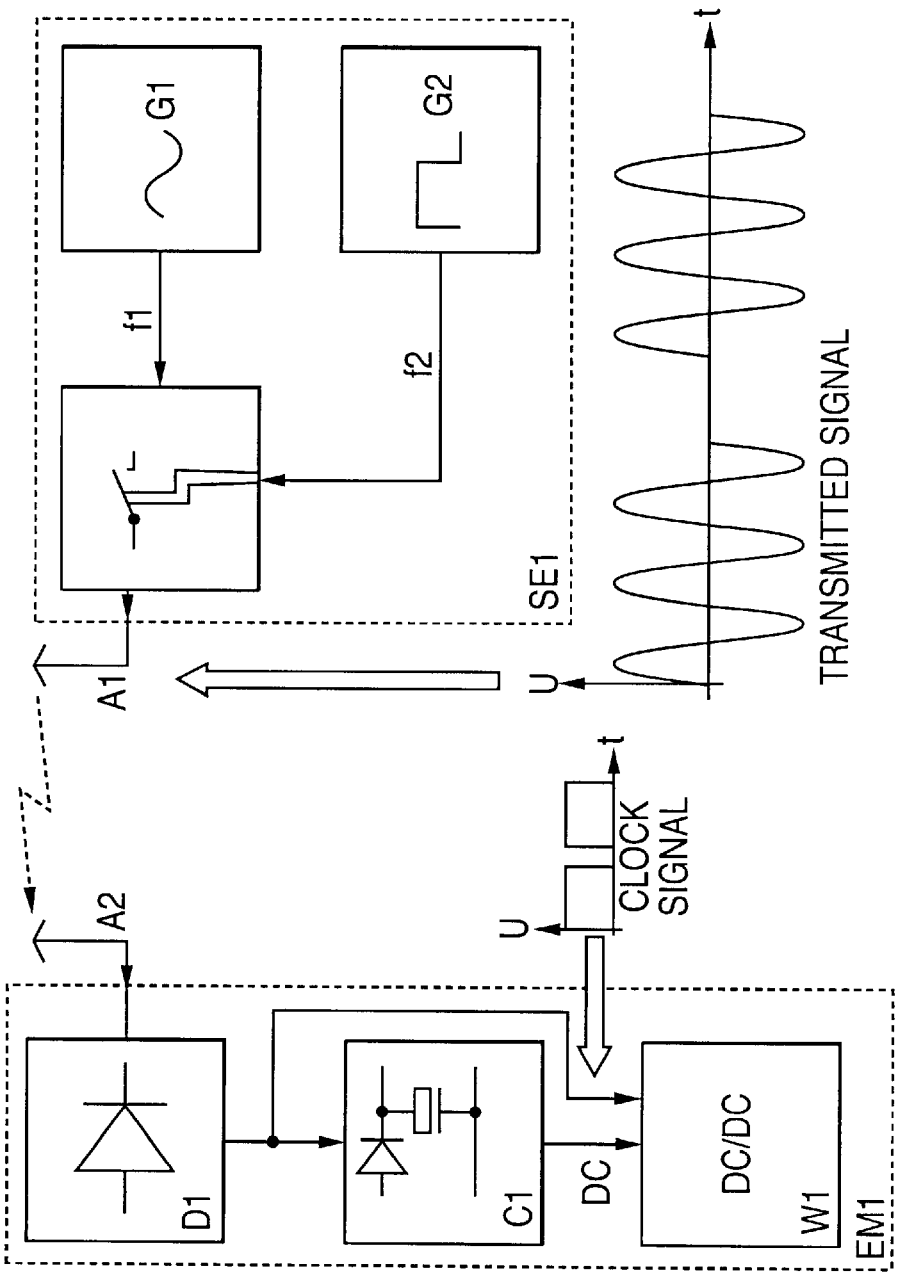
FIG. 1 shows a block diagram of the Power Transmission System according to an embodiment of the present invention.

Such a power transmission system will now be described by way of example. In FIG. 1 the transmitted signal produced by generator G1 of the transmitter SE1 is pulse-modulated with frequency f1 via circuit S1 with frequency f2. This modulation frequency f2 in turn is produced by a square wave generator G2. The transmitted signal is then emitted by antenna A1, possibly after additional amplification and filtering.

The receiver EM1 now picks up the signal with antenna A2 and supplies it to detector D1. At the output of this detector a DC voltage pulsed in time with the modulation frequency f2 is available. In a particularly advantageous embodiment of the invention, the same signal is now used to provide the clock for the DC-DC converter W1 on the one hand and its DC supply voltage on the other. This is accomplished in that the output signal of the detector is buffered by means of buffer capacitor C1, which is decoupled via a diode, so that sufficient power is available for the converter even during the pauses of the transmitted signal which are caused by pulse modulation.

To achieve better separation of the DC supply voltage from the clock, a band-pass or high-pass filter may be inserted in the path of the clock signal on the one hand and the DC supply voltage may be decoupled via an additional low-pass filter, particularly a reactor, on the other hand. This measure also reduces or prevents losses due to the switching times of the decoupling diode as well as undesirable negative feedback effects that may be created by a current consumption of the converter that depends on the converter clock.

In addition, the voltage level of the low frequency converter clock can be increased by impedance conversion. Besides transformers, particularly oscillating circuits tuned to the clock frequency with inductive or capacitive coupling or decoupling may also be used here. Through suitable circuit engineering measures, which are known as positive feedback, the signal level can be further increased.

If the quality of the clock signal is adequate as a result of the described filtering, the transmitter does not have to be completely disabled during pulse pauses, but merely transmits at reduced output, so that pulse modulation is replaced by amplitude modulation. Hence, in addition, energy is transmitted during pauses as well; on the other hand adjacent channel interference within the radio frequency spectrum is reduced.

Figure 2:
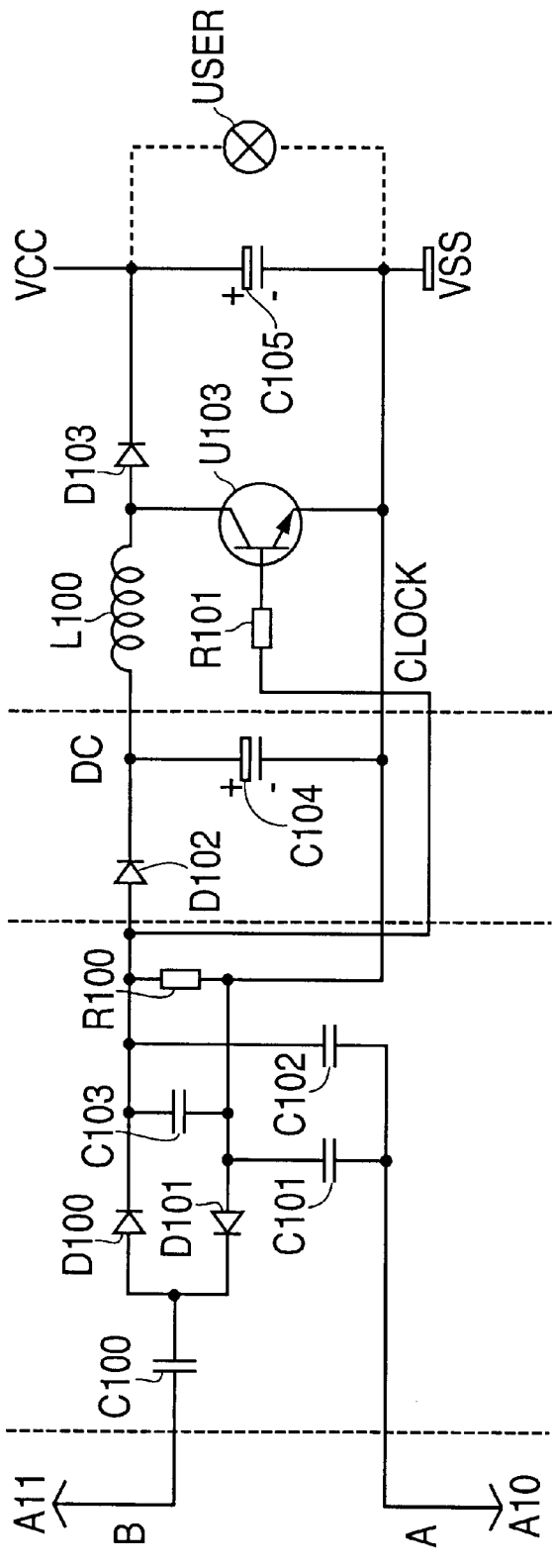
FIG. 2 shows a circuit diagram of the Power Transmission System according to an embodiment of the present invention.

The circuit of a receiver is depicted by way of example in FIG. 2. The signal is picked up via the dipole as the receiving antenna, which comprises halves A10 and A11, and is demodulated using a detector comprising capacitors C100 to C103, diodes D100 and D101, and resistor R100. The two diodes already double the voltage by using the peak-to-peak voltage of the received signal. C100 advantageously provides DC voltage type decoupling of the antenna from the receiver mass. With R100 as an additional load impedance, steeper clock signal edges, which are indispensable for proper efficiency of the converter, are achieved.

The output signal of the common detector is now converted into a minimally pulsating DC voltage by means of the buffer capacitor C104, which is decoupled with diode D102. This voltage is made available to the DC-DC converter.

When the high signal level of the converter clock is present, a steadily increasing current will flow through inductance L100, since the switching transistor V100, via the clock signal supplied by means of R101, is in its closed state. The buffer capacitor C104 is thereby partially discharged. Ideally, at the proper time prior to the complete discharge of C104, the clock signal will change to the lower signal level, additionally supported by load impedance R100. The switching transistor then abruptly interrupts the current flow through inductance L100 causing the latter to generate a high positive voltage pulse due to self-inductance at the common node with D103, which is further added to the remaining voltage of capacitor C104. This pulse is stored via diode D103 in a further buffer capacitor C105. At this capacitor, the increased output voltage, which is required for instance to operate logic circuits, is now available.

The efficiency of the converter can be further enhanced by suitable feedback. Suitable, in particular, is feedback of the generated pulse, for instance via another winding of L100 to the base of switching transistor V100.

It goes without saying that due to the high steepness of the pulse generated by inductance L100, the duration of the interruption of the transmitted signal can be kept very small due to pulse modulation, so that the transmitted power is enhanced. The square wave modulation signal used by the transmitter will have a high pulse duty ratio; this DC-DC converter type is therefore particularly well suited for power transmission according to the invention.

Of course, an integrated solution instead of the switching transistor is also feasible, as well as the theoretical use of semiconductor elements, for example, which at least on the voltages present at the detector or the buffer capacitor exhibit breakdown behavior (Z diodes).

In addition, to ensure a faster start of the converter, the frequency and pulse width of the clock signal can also be adapted dynamically by the transmitter. In particular, a pure carrier signal can initially be emitted for first-time charging of the buffer capacitor. When the required operating voltage is reached, feedback of load information to the transmitter is also feasible if a suitable reverse channel is available for this purpose.

In a further particularly advantageous embodiment of the invention it is also possible, after reaching the operating voltage necessary for logic circuits, to generate the further converter clock locally in the receiver and thus to control the converter output voltage, too, as a function of load. This switch may be communicated to the transmitter via a reverse channel, e.g., by a command in a digital data stream, so that the transmitter can be switched from pulsed operation to continuous operation to transmit additional power to the receiver.

For operation of the reverse channel, specific control of the impedance at the antenna is particularly suitable, which leads to a changed reflection behavior of the antenna and can be detected by the transmitter by means of additional receiving components (directional coupler in the antenna signal path and synchronous receiver connected thereto) in the manner of a radar object that changes its size. In the literature this type of retransmission of digital data sequences is also known as backscatter modulation. Advantageously, the request for continuous operation is synchronized with pulse modulation to obtain an optimal range of the reverse channel. Alternatively, the clock of the pulse modulation can also be used as a data clock or computer clock and only the pulse duty ratio further increased after switching.

This reverse channel can be simultaneously used for feedback, e.g., of measured values or identification codes. This creates a complete transponder system, to which this invention imparts a significantly greater range at reduced transmitter power and which in addition is extremely long-lived and environmentally friendly because it avoids the use of batteries.

What is claimed is:

1. A device for wireless power transmission, including a system for supplying transponders, comprising:
   at least one high-frequency transmitter that transmits a transmitted high-frequency output signal, and
   at least one high-frequency receiver that receives the transmitted high-frequency output signal,
   wherein the at least one high-frequency transmitter is connected to at least one antenna, and the at least one high-frequency receiver is connected to at least one antenna,
   wherein the receiver obtains its operating power from the transmitted high-frequency output signal from said transmitter,
   wherein (1) the transmitted high-frequency output signal from the transmitter is modulated with at least one converter clock suitable for a DC-DC converter, (2) the receiver has at least one detector for demodulating the at least one converter clock from the transmitted high frequency output signal, (3), the receiver generates a DC operating voltage for the DC-DC converter from the high-frequency output signal using at least one of a rectifier and the at least one detector, (4) the DC-DC converter, using the at least one converter clock, and generating another DC voltage to operate further circuit elements.

2. The device as claimed in claim 1, wherein the high frequency transmitter is pulse modulated or amplitude modulated.

3. The device as claimed in claim 1, wherein a DC operating voltage for the DC-DC converter is derived from a common rectifier and detector together with the converter clock, in that a common output signal is processed by means of at least one of a low-pass filter and at least one diode coupling and a buffer capacitor.

4. The device as claimed in claim 1, wherein the at least one converter clock for the DC-DC converter is derived from a common rectifier and detector together with a DC operating voltage for the DC-DC converter, in that a common output signal is processed by means of at least one of a high-pass filter and at least one band pas filter.

5. The device as claimed in claim 1, wherein a voltage level of the at least one converter clock is increase by impedance conversion by means of one of a transmitter and resonant circuit.

6. A device for wireless power transmission, including a system for supplying transponders, comprising:
   at least one high-frequency transmitter that transmits a transmitted high-frequency output signal, and
   at least one high-frequency receiver that receives the transmitted high-frequency output signal,
   wherein the at least one high-frequency transmitter is connected to at least one antenna, and the at least one high frequency receiver is connected to at least one antenna,
   wherein the receiver obtains its operating power from the transmitted high-frequency output signal from said transmitter,
   wherein (1) the transmitted high-frequency output signal from the transmitter is modulated with at least one converter clock suitable for a DC-DC converter, (2) the receiver has at least one detector for demodulating the at least one converter clock from the transmitted high frequency output signal, (3) the receiver generates a DC operating voltage for the DC-DC converter from the high-frequency output signal using at least one of a rectifier and the at least one detector, (4) the DC-DC converter, using the at least one converter clock, and generating another DC voltage to operate further circuit elements,
   wherein one of an inductive switching controller and an inductive switching converter is used as the DC-DC converter, which by means of at least one electronic switch controlled by the converter clock, including a transistor, allows a switched current to flow through at least one inductance and thereby generate a high voltage at the at least one inductance during a disabling process, wherein the high voltage can be picked off directly using a fast switching diode, or decoupled via an additional inductance.

7. The device as claimed in claim 6, wherein a feedback pulse is generated at the inductance at the DC-DC converter to an input of the DC-DC converter.

8. The device as claimed in claim 1, wherein after initially generating an increased DC voltage to start up the circuit elements, converter clock generation is taken over locally in the receiver using the started circuit elements, including by one of local oscillators and by derivation from digitally encoded information of the transmitted signal, which makes it possible to use the radio frequency for data transmission purposes and further allows local load-dependent control of converter output voltage.

9. The device as claimed in claim 8, further comprising a reverse channel that communicates to the transmitter when the converter clock generation has been taken over in the receiver, which causes the transmitter to switch to a different operating state so that one of pulse modulation and amplitude modulation is replaced by one of a continuous transmitted signal (continuous wave) and a transmitted signal with a different pulse duty ratio.

10. The device as claimed in claim 1, further comprising specifically controlled semiconductor elements that cause impedance changes on at least one of an antenna of the receiver and at least one rectifier and detector of the receiver, which are used for feedback of digital information from the receiver to the transmitter, which is equipped with additional receiving components by changing a reflection and absorption behavior of a receiving antenna (backscatter modulation).

* * * * *